United States Patent
Taylor et al.

(10) Patent No.: US 12,449,719 B2
(45) Date of Patent: Oct. 21, 2025

(54) PHASED METALENS DEPTH OF FOCUS INCREASE FOR CAMERA FOCUSING

(71) Applicant: Aptiv Technologies AG, Schaffhausen (CH)

(72) Inventors: Ronald M. Taylor, Greentown, IN (US); Morgan Daniel Murphy, Kokomo, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 654 days.

(21) Appl. No.: 17/930,030

(22) Filed: Sep. 6, 2022

(65) Prior Publication Data

US 2024/0077784 A1 Mar. 7, 2024

(51) Int. Cl.
*G03B 13/32* (2021.01)
*G06V 20/56* (2022.01)
*H04N 23/67* (2023.01)

(52) U.S. Cl.
CPC ............ *G03B 13/32* (2013.01); *H04N 23/67* (2023.01); *G06V 20/56* (2022.01)

(58) Field of Classification Search
CPC ........ G03B 13/32; H04N 23/67; G06V 20/56; G06V 20/58; G06V 20/582; G06V 20/584; G06V 20/588; G02B 27/0075
See application file for complete search history.

(56) References Cited

U.S. PATENT DOCUMENTS

| | | | |
|---|---|---|---|
| 4,693,555 A | 9/1987 | Arai et al. | |
| 6,144,510 A | 11/2000 | Neil et al. | |
| 10,362,203 B2 | 7/2019 | Taylor et al. | |
| 10,408,416 B2 | 9/2019 | Khorasaninejad et al. | |
| 10,437,012 B1 | 10/2019 | Gurin | |

(Continued)

FOREIGN PATENT DOCUMENTS

| | | | |
|---|---|---|---|
| CN | 102472884 A | 5/2012 | |
| CN | 202975472 U | 6/2013 | |

(Continued)

OTHER PUBLICATIONS

Chen et.al., "Principles, Functions, and Applications of Optical Meta-Lens." Adv. Optical Mater. 2021, 9, Apr. 14, 200. https://doi.org/10.1002/adom.202001414 (Year: 2021).*

(Continued)

*Primary Examiner* — Angela M. Medich
(74) *Attorney, Agent, or Firm* — Harness, Dickey & Pierce, P.L.C.

(57) ABSTRACT

Described is phased metalens depth of focus increase for camera focusing. An objective camera lens is configured to provide a focus window across multiple radial zones within a field of view. A camera imager is configured to capture an image of the field of view. When at least two of the radial zones have different back focal lengths relative the imager and the objective lens, a phased metalens is positioned between the objective lens and the camera imager. The metalens is configured to compensate for defocus caused by the different back focal lengths by increasing, across the radial zones within the field of view, a depth of the focus window. The metalens improves focus across the field of view, which prevents variations in objective lens characteristics from reducing image quality.

20 Claims, 8 Drawing Sheets

(56) References Cited

U.S. PATENT DOCUMENTS

| | | |
|---|---|---|
| 11,089,188 B1 | 8/2021 | Taylor et al. |
| 11,089,197 B1 | 8/2021 | Taylor et al. |
| 11,201,993 B1 | 12/2021 | Wang et al. |
| 11,431,881 B2 | 8/2022 | Taylor et al. |
| 2003/0226951 A1 | 12/2003 | Ye et al. |
| 2007/0221826 A1 | 9/2007 | Bechtel et al. |
| 2010/0265048 A1 | 10/2010 | Lu et al. |
| 2011/0080479 A1 | 4/2011 | Trumbo et al. |
| 2013/0274923 A1 | 10/2013 | By |
| 2015/0293330 A1 | 10/2015 | Gutierrez |
| 2016/0094841 A1 | 3/2016 | Wang et al. |
| 2017/0082263 A1 | 3/2017 | Byrnes et al. |
| 2017/0146806 A1 | 5/2017 | Lin et al. |
| 2017/0195545 A1 | 7/2017 | Campbell et al. |
| 2017/0201744 A1 | 7/2017 | Wong et al. |
| 2017/0219739 A1 | 8/2017 | Lin et al. |
| 2018/0059354 A1 | 3/2018 | Gutierrez et al. |
| 2018/0292644 A1 | 10/2018 | Kamali et al. |
| 2019/0094489 A1 | 3/2019 | Dobashi |
| 2019/0154877 A1* | 5/2019 | Capasso ............... G02B 5/18 |
| 2019/0170314 A1 | 6/2019 | Lenef et al. |
| 2019/0178720 A1 | 6/2019 | Padilla et al. |
| 2019/0383969 A1 | 12/2019 | Badano et al. |
| 2020/0001787 A1 | 1/2020 | Lu et al. |
| 2020/0096672 A1 | 3/2020 | Yu et al. |
| 2020/0099851 A1 | 3/2020 | Chino et al. |
| 2020/0183050 A1 | 6/2020 | Lin et al. |
| 2020/0225386 A1 | 7/2020 | Tsai et al. |
| 2020/0264343 A1 | 8/2020 | Han et al. |
| 2021/0003382 A1 | 1/2021 | Adie et al. |
| 2021/0044748 A1 | 2/2021 | Hu et al. |
| 2021/0068665 A1 | 3/2021 | Pahlevaninezhad et al. |
| 2021/0080819 A1 | 3/2021 | Terasawa et al. |
| 2021/0132272 A1 | 5/2021 | Zhu et al. |
| 2021/0172879 A1 | 6/2021 | Chen et al. |
| 2021/0235001 A1 | 7/2021 | Taylor et al. |
| 2021/0307608 A1 | 10/2021 | Hu et al. |
| 2021/0337095 A1 | 10/2021 | Taylor et al. |
| 2021/0337140 A1 | 10/2021 | Siddique et al. |
| 2023/0358989 A1* | 11/2023 | Taylor ............... G02B 7/023 |

FOREIGN PATENT DOCUMENTS

| | | |
|---|---|---|
| CN | 108241208 A | 7/2018 |
| CN | 108802862 A | 11/2018 |
| CN | 208283579 U | 12/2018 |
| CN | 109164518 A | 1/2019 |
| CN | 109507765 A | 3/2019 |
| CN | 109561243 A | 4/2019 |
| CN | 110455418 A | 11/2019 |
| CN | 111103739 A | 5/2020 |
| CN | 109391754 B | 11/2020 |
| EP | 3385766 A1 | 10/2018 |
| EP | 3445050 A1 | 2/2019 |
| EP | 3855246 A1 | 7/2021 |
| EP | 3992671 A1 | 5/2022 |
| WO | 2018118984 A1 | 6/2018 |
| WO | 2020214617 A1 | 10/2020 |

OTHER PUBLICATIONS

"Foreign Office Action", CN Application No. 202011378329.3, Jan. 28, 2023, 11 pages.
"Foreign Office Action", EP Application No. 20207221.1, Apr. 13, 2023, 5 pages.
"Extended European Search Report", EP Application No. 22198914.8, Aug. 22, 2023, 9 pages.
"Foreign Office Action", CN Application No. 202011378329.3, Sep. 5, 2022, 16 pages.
"Epoxy Adhesive Application Guide", Epoxy Technology, Jan. 1, 2016, 48 pages.
"Extended European Search Report", EP Application No. 18185005.8, Oct. 31, 2018, 7 pages.
"Extended European Search Report", EP Application No. 20207221.1, Mar. 26, 2021, 8 pages.
"Extended European Search Report", EP Application No. 21181685.5, Nov. 24, 2021, 10 pages.
"Foreign Office Action", CN Application No. 201810876682.0, Apr. 10, 2020, 12 pages.
"Foreign Office Action", CN Application No. 202011378329.3, Dec. 31, 2021, 27 pages.
"Foreign Office Action", CN Application No. 202110698978.X, Jun. 29, 2022, 16 pages.
"Foreign Office Action", EP Application No. 18185005.8, May 12, 2021, 4 pages.
"Foreign Office Action", EP Application No. 18185005.8, Sep. 8, 2020, 5 pages.
"Foreign Office Action", EP Application No. 18185005.8, Nov. 11, 2019, 7 pages.
Afridi, et al., "Electrically Driven Varifocal Silicon Metalens", Oct. 2018, 17 pages.
Ding, et al., "Graphene aperture-based metalens for dynamic focusing of terahertz waves", Oct. 15, 2018, 13 pages.
Jang, et al., "Complex wavefront engineering with disorder-engineered metasurfaces", Jun. 27, 2017, 21 pages.
Jin, et al., "Temperature-tuned and excellent omnidirectional bending of light to the normal for energy concentration in an index-continuous structure", Jul. 27, 2020, 10 pages.
Kamali, et al., "Conformal and Tunable Optical Dielectric Metasurfaces Based on Flexible Stretchable Substrates", Oct. 2016, pp. 406-407.
Khorasaninejad, et al., "Metalenses at Visible Wavelengths: Diffraction-limited Focusing and Subwavelength Resolution Imaging", Jun. 3, 2016, pp. 1190-1193.
Li, et al., "A Metalens-Based Virtual Reality (VR) / Augmented Reality (AR) System", Jan. 2020, 2 pages.
Liu, et al., "Ultrathin van der Waals metalenses", Oct. 2018, 22 pages.
She, et al., "Adaptive Metalenses with Simultaneous Electrical Control of Focal Length, Astigmatism, and Shift", Feb. 23, 2018, 8 pages.
Yacobi, et al., "Adhesive Bonding in Microelectronics and Photonics", Journal of Applied Physics, American Institute of Physics, vol. 91, No. 10, May 15, 2002, 36 pages.
Yang, et al., "Multiobjective Firefly Algorithm for Continuous Optimization", Apr. 2013, 17 pages.
Yu, et al., "Flat Optics with Designer Metasurfaces", Nature Materials, vol. 13, Feb. 2014, pp. 139-150.
"Extended European Search Report," EP Application No. 23163100.3, Sep. 18, 2023, 8 pages.
Jacob Engelberg et al., "Near-IR wide field-of-view Huygens metalens for outdoor imaging applications", ARXIV.org, Cornell University Library, 201 Olin Library Cornell University, Ithaca, NY 14853, Jan. 22, 2019, XP081006647, 21 pages.
"Extended European Search Report", EP Application No. 22197227.6, May 19, 2023, 11 pages.
"Extended European Search Report", EP Application No. 22197707.7, May 19, 2023, 11 pages.
Bitzer, et al., "Active Alignment for Cameras in Mobile Devices and Automotive Applications", 2010 12th Electronics Packaging Technology Conference, Dec. 8, 2010, pp. 260-264.
Bräuniger, et al., "Automated Assembly of Camera Modules using Active Alignment with up to Six Degrees of Freedom", Mar. 8, 2014, 8 pages.

* cited by examiner

PHASED METALENS DEPTH OF FOCUS INCREASE FOR CAMERA FOCUSING

BACKGROUND

Fixed-focus cameras are commonly adopted in automotive applications because of their affordability and reliability under extreme operating conditions. A Modular Transfer Function (MTF) is a performance metric of camera focus ability. The MTF of a fixed-focus lens can be improved by adjusting a Back Focal Length (BFL) to set a lens at a precise, fixed position relative a focal plane. Focusing lenses this way presents challenges. Even minor deficiencies in MTF at just a few field positions can prevent lenses from being focused over a desired field. Lenses that cannot be focused are discarded. Replacement lenses may be unavailable or in short supply given their high demand across many industries. More expensive replacement lenses may be used. Wasting lenses because of insufficient MTF upon integration can induce long production delays and substantially increase costs.

SUMMARY

This summary is provided to introduce aspects of phased metalens depth of focus increase for camera focusing, which is further described below in the Detailed Description and Drawings. This summary is not intended to identify essential features of claimed subject matter, nor is it intended for use in determining scope of claimed subject matter.

In one example, a system includes an objective camera lens configured to provide a focus window across multiple radial zones within a field of view. The system further includes a camera imager configured to capture an image of the field of view, wherein at least two of the radial zones have different back focal lengths relative the imager and the objective lens. The system also has a phased metalens configured to compensate for defocus caused by the different back focal lengths by increasing, across the radial zones within the field of view, a depth of the focus window. In another example, an apparatus is described including this or other example systems, which configure the apparatus to improve camera focus by increasing depth of focus using phased metalens technology. As some examples, a camera device, an automotive camera module, a mobile device camera, or other imaging platform utilizing a fixed-focus lens assembly can apply phased metalenses using the described techniques for improved focus capability in a variety of applications beyond just automotive.

The techniques described herein, including any described process or method, may be performed by the examples systems, including hardware or a combination of hardware and software executing thereon. For example, a computer-readable storage media may have instructions stored thereon and that when executed configure a processor to perform processes, methods, and the described techniques. A system may include means for performing the described methods, processes, and techniques. A processor or processor unit may be part of a system that is configured to execute the methods, processes, and techniques described herein.

BRIEF DESCRIPTION OF THE DRAWINGS

Details related to phased metalens depth of focus increase for camera focusing are described in this document with reference to the Drawings, which may use same numbers to reference like features and components and hyphenated numbers to designate variations of these like features and components. The Drawings are organized as follows:

FIG. 3-1 illustrates a line graph showing a focus window of an objective lens when a variation in back focal lengths across multiple zones without applying a phased metalens depth of focus increase across the multiple zones;

FIG. 3-2 illustrates a line graph showing a focus window of an objective lens when a variation in back focal lengths across multiple zones after applying a phased metalens depth of focus increase across the multiple zones;

DETAILED DESCRIPTION

Introduction

A fixed-focus camera system may be integrated in a vehicle to capture images to support vehicle functions and safe driving under a wide range of operating conditions. For example, camera based vehicle functions may be executed by an advanced driver assistance system (ADAS), an advanced safety system, an autonomous drive system, a user interface, or other component configured to process image data. Properly assembling a fixed-focus camera includes focusing the lens to the imager to achieve sufficient MTF and/or pixel variation over the entire field. Even though a lens may satisfy specifications or production tolerances prior to focusing, once integrated into a camera, the lenses may fail to achieve sufficient focus ability at all field positions.

For example, there may be no BFL that can cure all defocus across the entire field. Each position of a lens has an ideal BFL; the ideal BFL can vary across different zones (e.g., radial regions around center) of a field of view. With adjustment to the BFL, the MTF may increase in some zones and diminish in others. It may not be possible to tune the BFL for maximizing the MTF across an entire field; instead, the BFL can be set to achieve a minimum desired focus ability for all zones. Known as an intermediate back focal length, the intermediate BFL may be chosen such that a center region is positioned with a shorter BFL, and focused slightly ahead, the ideal BFL for center region positions. An outer region of the image field is at a longer BFL and focused slightly behind of the ideal BFL for its outer radial positions. This approach minimizes residual defocus over the entire image field.

Another challenge during focusing is in satisfying a Depth of Focus (DoF) specified for each lens. The DoF is a tolerance for varying placement of that lens relative a focal plane. A shape of the lens and/or focal plane can be non-planar, which causes minor variations in the BFL (of only a few microns) at different points in the field. Other factors can cause variations in the BFL (e.g., temperature induced focus shift, warpage). Too much variation in BFL over the field can violate the DoF of a lens and cause images to be generated with too little focus margin; images have insignificant pixel contrast variation between focused and unfocused zones.

When the lenses fail focusing for these or other reasons, the lenses are discarded. Wasting lenses that fail to focus can substantially increase camera production costs. Replacement lenses may be used in a wide range of technologies or in many industries; an insufficient supply of replacements may prevent further focusing and delay production, which can further drive up costs. While higher quality lenses with greater MTF may be suitable, they may only be available at substantially higher price points. Unaffordable cameras inhibit their widespread adoption across all vehicle classes and price points, which deters public safety.

This document describes phased metalens depth of focus increase for camera focusing. An objective problem solved through techniques of this disclosure is in providing ways to still use lenses, which fail to focus after integration in a fixed-focus camera, without substantial increasing complexity of the camera assembly and/or material costs. Another problem overcome with these techniques is to improve MTF of a fixed-focus camera over an entire field, even when using affordable lenses with variations in quality and/or characteristics.

Figure 31:
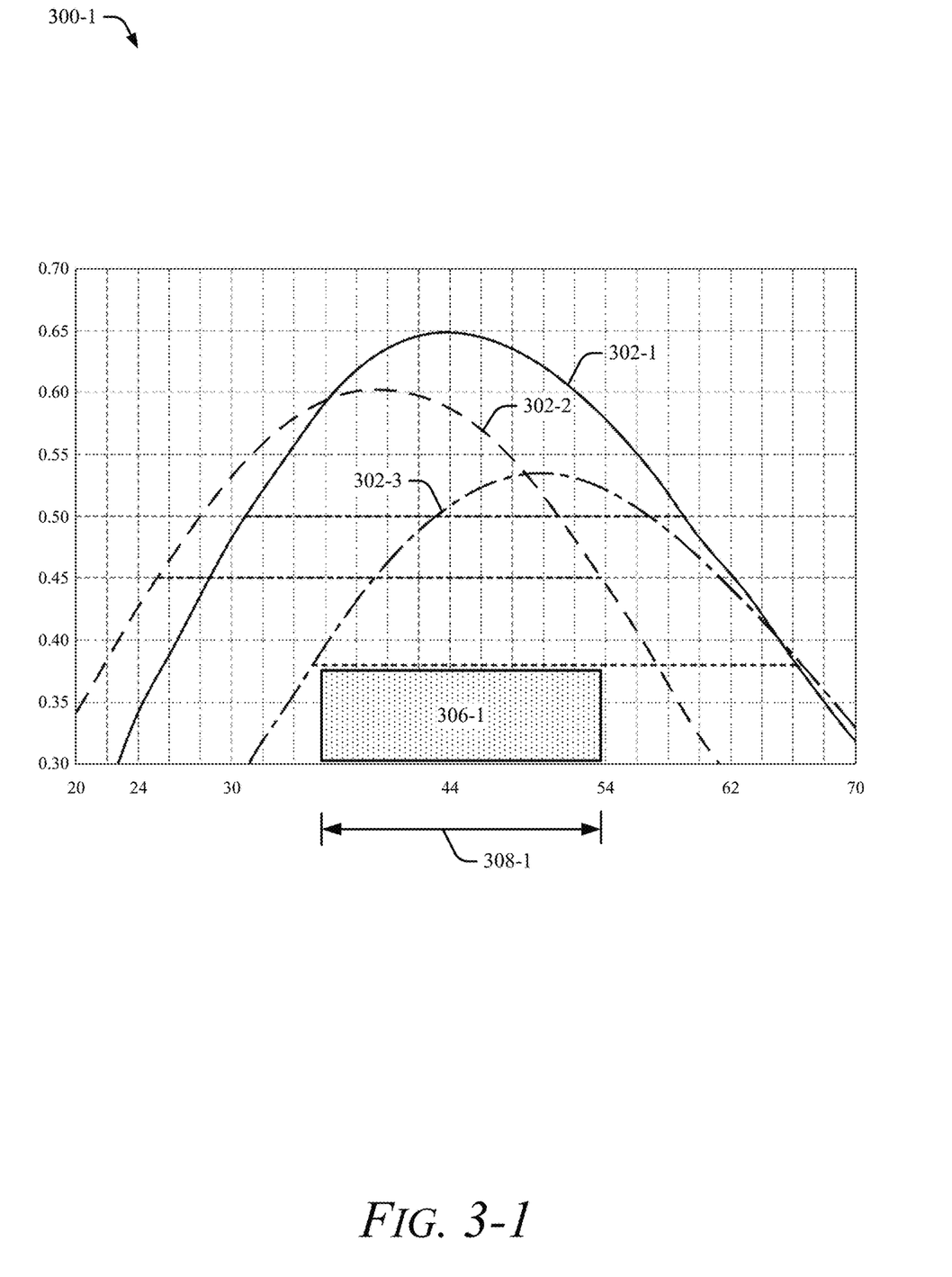
Figure 32:
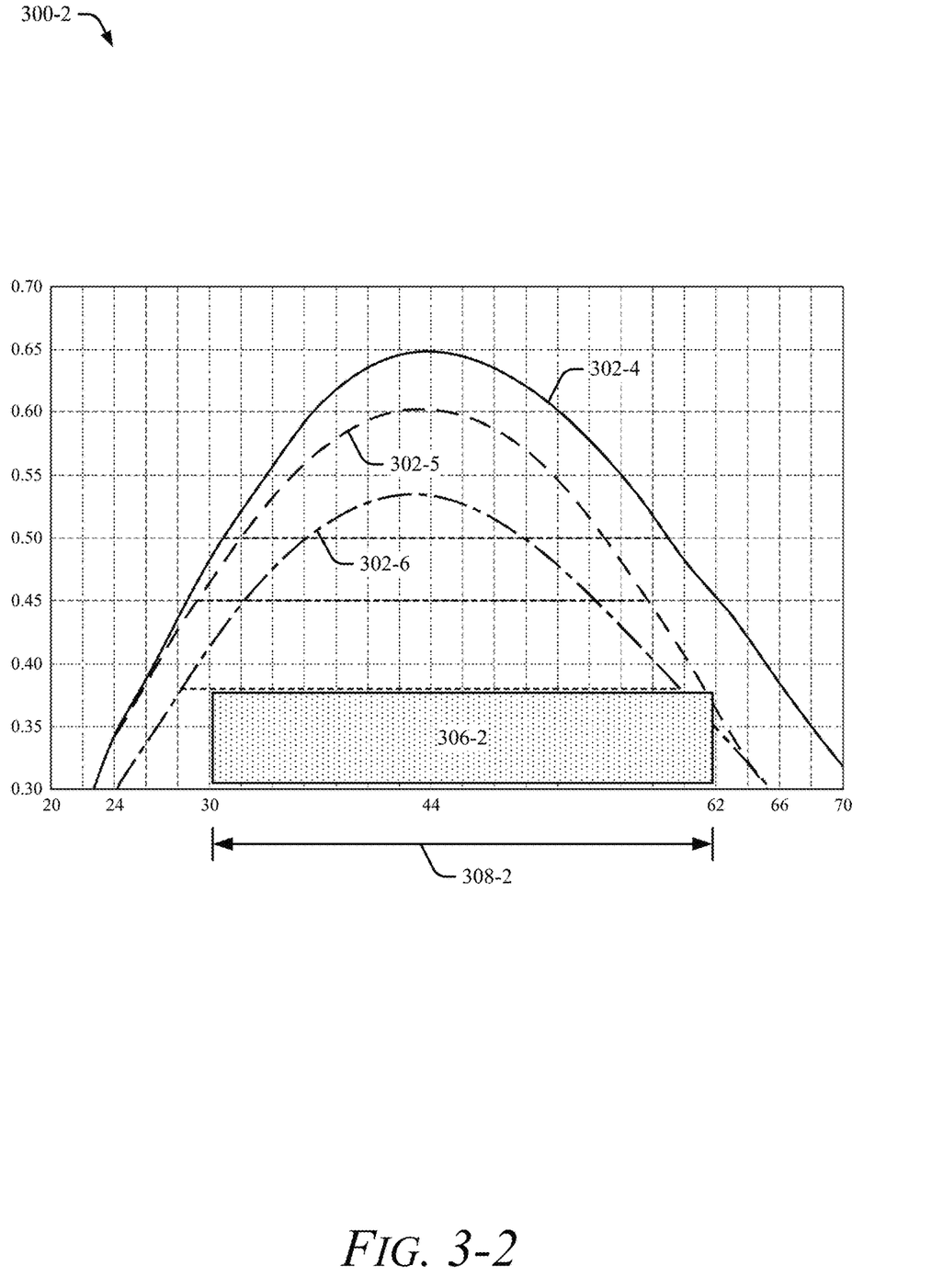

To address problems such as this or provide other advantages as made clear from the description below, consider an example system. An objective camera lens is configured to provide a focus window for the system across multiple radial zones within a field of view. A camera imager of the system is configured to capture an image of the field of view. When at least two of the radial zones have different back focal lengths relative the imager and the objective lens, a phased metalens is positioned in the system between the objective lens and the camera imager. The metalens is configured to compensate for defocus caused by the different back focal lengths by increasing, across the radial zones within the field of view, a depth of the focus window. With the addition of the metalens, the system improves a depth of focus of the lens across the field of view, which prevents variations in objective lens characteristics from reducing image quality. For example, a typical lens specification defines a very small depth of focus tolerance (e.g., less than plus or minus five microns); a phased metalens used in accordance with the described techniques is shown to effectively increase this depth of focus by at least plus or minus four microns (e.g., seventy-five percent). For example, as shown from comparison of focus abilities provided in the examples of FIG. 3-1 and FIG. 3-2, by scaling the depth of focus using a phased metalens in accordance with the described techniques can result in a substantial improvement of between eighteen (e.g., plus and minus nine) microns and thirty-two (e.g., plus and minus sixteen) microns. This way, even lenses that provide only marginal focus performance at some lens positions can be adapted using phased metalens technology to satisfy minimum focus performance for the entire field. Rather than discarding lenses, the described techniques allow lenses that fail to achieve focus performance from existing BFL tuning and lens repositioning, to be adapted for achieving a desired focus performance across the field.

As such, phased metalens depth of focus increase for camera focusing, as described herein, enables inexpensive fixed-focus cameras to generate high quality images across an entire field.

Adoption of this technology promotes camera integration within automotive applications and/or vehicles, which advances vehicle and public safety.

Example Environment

Figure 1:
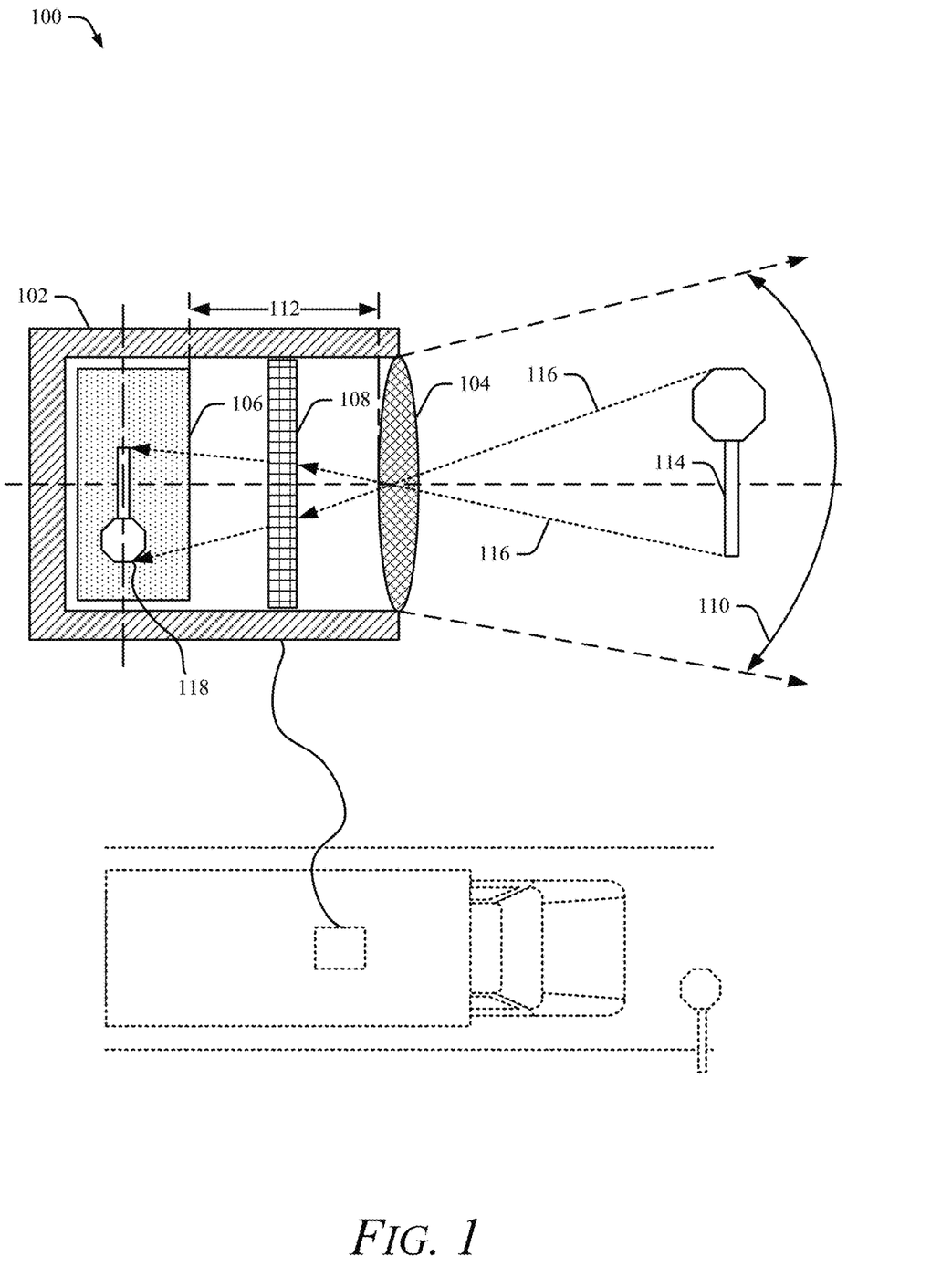
FIG. 1 illustrates a conceptual diagram of an environment for phased metalens depth of focus increase for camera focusing, in accordance with techniques of this disclosure.

FIG. 1 illustrates a conceptual diagram of an environment 100 for phased metalens depth of focus increase for camera focusing, in accordance with techniques of this disclosure. The environment 100 shows a fixed-focus camera system 102 configured to capture images of driving situations for a vehicle, also referred to as a host vehicle. For example, the camera system 102 may be in communication with a processor that controls a vehicle configured to operate on a roadway based on images captured by the camera system 102. For illustrative purposes, the host vehicle is a box truck traveling on a roadway. However, the camera system 102 may be installed on any automobile or other vehicle where image data enables automated or partially automated controls and/or other image-based functions (e.g., object detection).

The camera system 102 includes a camera lens 104 (e.g., an objective camera lens) configured to provide a focus window across multiple radial zones of a field of view 110. The focus window may include all or part of the field of view 110. The camera lens 104 is configured to capture light 116 reflecting from the environment 100 and direct the light 116 through the camera lens 104 and towards a focal plane. In some examples, multiple camera lenses (not shown) of varying geometries may be used in the camera system 102, depending on the application requirements. Capturing the light 116 enables the camera system 102 to generate images 118 of the environment 100. For example, the light 116 may reflect from background features and at least one object of interest 114 in the field of view 110. The light 116 is captured and processed to generate the images 118 with sufficient focus margin/pixel variation between the background and the object of interest 114, which may further permit execution of image-based applications and/or vehicle functions.

The camera system 102 includes a camera imager 106 (sometimes referred to as "image sensor") configured to provide the focal plane on a surface aligned with the focus window. The camera imager 106 is configured to generate images 118 based on an intensity of the light 116 that reaches the focal plane. For example, the camera imager 106 outputs image data to a vehicle controller or ADAS system of the host vehicle (e.g., the box truck) to provide situational awareness about the environment 100 as the host vehicle operates on a road. The images 118 include sufficient pixel variation to differentiate the object of interest 114 from the background.

The focal plane of the camera imager 106 may include a two-dimensional array of pixels organized into rows and columns based on a specific resolution desired for the camera system 102. Each pixel, or group of pixels (e.g., reg, green, blue), on the focal plane may include optical circuitry, such as Charge Coupled Device (CCD) circuits and/or Complementary Metal Oxide Semiconductor (CMOS) circuits. This circuitry is configured to output an electrical signal indicating an intensity of the light 116 detected for that pixel or group. The camera imager 106 may combine electrical signals obtained from multiple pixels to generate the images 118. From the camera imager 106, the images 118 can be output from the camera system 102 and to a controller, a processor, or other vehicle system.

Even though the camera lens 104 may satisfy specifications or production tolerances, once integrated into the camera system 102, the camera lens 104 may fail to achieve sufficient focus ability at all field positions in the focus window after being mated with the camera imager 106. To properly assemble the fixed-focus camera system 102, the camera lens 104 is focused to the camera imager 106 to achieve sufficient MTF and/or pixel variation over the entire field. This enables high quality images to be generated with sufficient focus margin at any position in the field of view 110.

As a fixed-focus camera, the camera system 102 does not include a mechanical or electrical focus adjustment device to refocus or correct for defocus. Instead, to focus the camera lens 104 to the camera imager 106, a BFL 112 of the camera system 102 is tuned during assembly to achieve a sufficient performance. After focusing the camera system 102, the camera lens 104 and the BFL 112 is fixed. For example, the camera system 102 may include a camera housing configured to maintain the camera lens 104 at the fixed position.

Tuning the BFL 112 can be difficult without high quality and/or expensive lenses. Often, the camera lens specifications cause the camera system 102 to have at least two different back focal lengths at two or more different radial zones (e.g., each including a different region of radial positions) from center of the field of view 110. For instance, the camera lens 104 may have an ideal BFL that varies across different radial zones. The DoF specified for achieving the focus window with the camera lens 104 may provide for little variation in tuning the fixed positioning of the camera lens 104. Further, the camera lens 104 and/or the focal plane of the camera imager 106 can have variation in their flatness or shape. As such, the BFL 112 chosen may increase focus ability and/or the DoF at some radial zones but reduce MTF and pixel variation achievable in other zones. Rather than rely on precise tuning of the BFL 112 to achieve maximum focus ability, the camera system 102 includes a phased metalens 108.

The phased metalens 108 is a static element at a fixed position between the camera lens 104 and a focal plane of the camera imager 106. For example, the fixed positioned may be within one millimeter of a surface (the focal plane) of the camera imager 106. A camera housing may be configured to maintain the phased metalens 108 at the fixed position relative the camera lens 104 and/or the camera imager 106. The phased metalens 108 is configured to compensate for defocus caused by the different back focal lengths through increasing, across the radial zones within the field of view, a depth of the focus window. To cause light transmitted from the objective lens and to the focal plane to be adjusted, surface structures on the phased metalens 108 are configured to shift the light 116 before it reaches the focal plane such that defocus between different radial zones due to variation in the BFL 112 is obviated. Substantially all the light 116 out of the camera lens 104 is shifted by the surface structures such that the light 116 reaches the focal plane at approximately the same time. The surface structures are arranged in specific ways at different radial zones to cause the light 116 to arrive as wavefronts detected at the focal plane at approximately the same time.

As such, the camera system 102 obtains a phased metalens depth of focus increase for camera focusing. The camera lens 104 used may be of varying quality and lens specifications. Despite this, the phased metalens 108 can compensate their defocus so they can be used in high performance cameras like those for ADAS systems and vehicle control. With greater image quality over the entire field, the images 118 generated by the camera system 102 can improve performance of automotive applications and/or vehicle functions that depend on them, which further promotes safety at a reduced cost.

Example System

Figure 2:
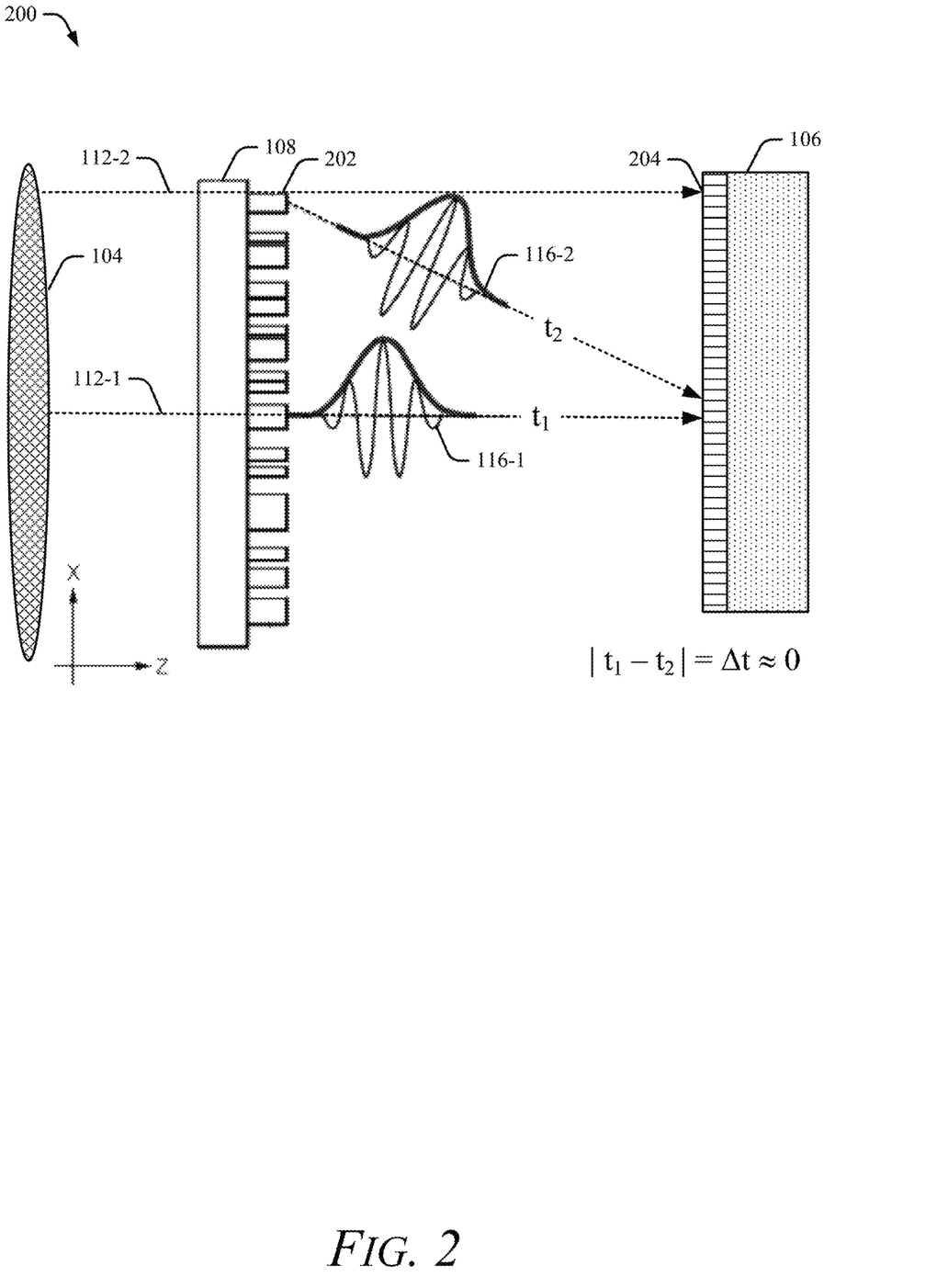
FIG. 2 illustrates a conceptual diagram of a system with a phased metalens depth of focus increase for camera focusing, in accordance with techniques of this disclosure.

FIG. 2 illustrates a conceptual diagram of a system 200 with a phased metalens depth of focus increase for camera focusing, in accordance with techniques of this disclosure. The system 200 is an example of a portion of the camera system 102 from FIG. 1 and is described in the context of the environment 100.

In the system 200, the camera lens 104 is fixed at the BFL 112 relative a focal plane 204 of the camera imager 106. However, as shown, the exact BFL between different zones of the camera lens 104 is different. A first zone of the camera lens 104 may be at a BFL 112-1, which is longer or shorter than a BFL 112-2 measured at a second zone. Without the phased metalens 108, light 116-1 from the first zone may be detected as wavefronts reaching the focal plane 204 at a first time t1, and light 116-2 from the second zone may be detected as wavefronts reaching the focal plane 204 at a second (e.g., different) time t2. Defocus can occur as a result making objects difficult to distinguish from the background.

The phased metalens 108 can compensate for this defocus when arranged opposite from, and substantially parallel to, the focal plane 204. Formed from a thin (e.g., one millimeter thick) and optically transparent material (e.g., optical glass), the phased metalens 108 includes a mostly flat, substrate portion. On or within this relatively thin, and generally planar, substrate portion, the phased metalens 108 includes a plurality of structures 202. The structures 202 are configured to achieve near diffraction limited focusing over all wavelengths of the light 116-1 and 116-2 for one or more specific light spectrums (e.g., visible light, ultra-violet light, near-infrared light). The structures 202 shift the light 116-1 and 116-2 for all wavelengths in these specific light spectrums. Sub-wavelength structures may be included in the structures 202. Also referred to as nanostructures, the sub-wavelength structures may range from two times to eight times smaller than a wavelength associated with these specific light spectrums. The structures 202 can include a plurality of resolution units, with sizes based on a size of image pixels in the field of view 110; each resolution unit is aligned with a certain field position on the focal plane 204.

The structures 202 are arranged in the system 200 to be between the camera lens 104 and the camera imager 106. The structures 202 can include sub-surface structures, surface structures, or a combination thereof. Sub-surface structures can redirect the light 116 before the light 116 exits the substrate, and surface structures can shift the light 116 it exits from the substrate toward the focal plane 204. For example, the structures 202 include surface structures arranged on the phased metalens 108 on a substrate surface that faces the focal plane 204. The surface structures can be formed from one or more metamaterials that are deposited on the substrate surface, for example, using lithographic processes to achieve a specific arrangement of the structures 202 for a particular metalens design. In some examples, the structures 202 include sub-surface structures, with or without including surface structures. Sub-surface structures can be formed by depositing metamaterials within the substrate itself. Metamaterials can be deposited at least partially below the substrate surface facing the camera imager 106.

The structures 202 and/or portions of the substrate can be fabricated in various ways. The structures 202 can be fabricated from one or more chemical compounds, such as, titanium dioxide, silicon nitride, boron nitride, molybdenum disulfide, polytetrafluoroethylene (PTFE), or a combination thereof. A selection of metamaterials for a particular design for the structures 202 may be based on desired wavelengths of light or other electromagnetic radiation being detected. For instance, titanium dioxide may be selected for light in the visible and near-infrared spectrum, and silicon nitride may be selected for light in the visible spectrum alone. In other examples, boron nitride may be selected for electromagnetic radiation at wavelengths below the visible and near-infrared spectrum (e.g., ultraviolet light). In contrast, molybdenum disulfide may be selected for electromagnetic radiation at wavelengths in the near-infrared spectrum.

Figure 4:
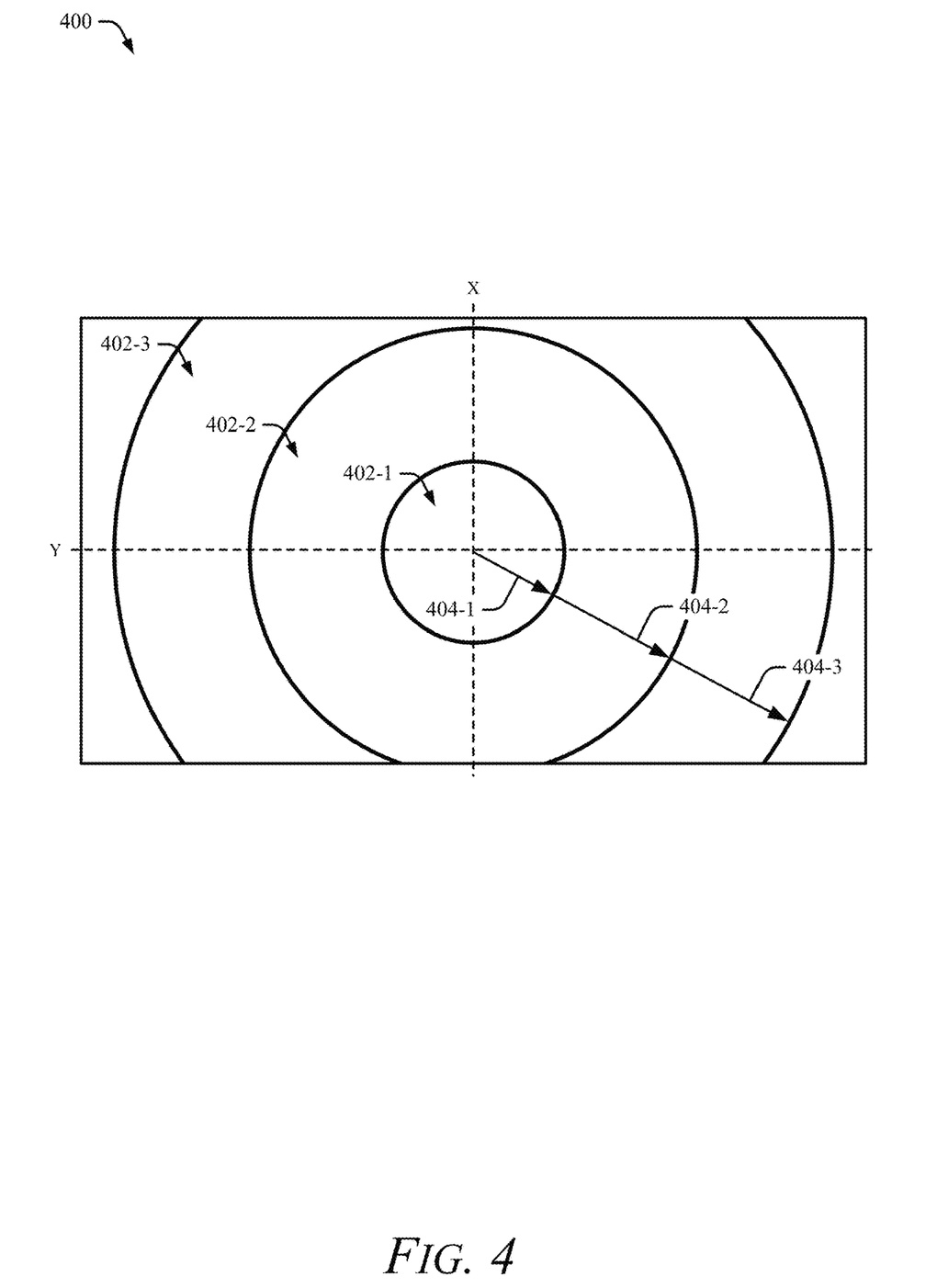
FIG. 4 illustrates a conceptual diagram of multiple zones of an objective camera lens which vary in back focal length across the multiple zones.

In an example design, the structures 202 are arranged into multiple groups, each of the groups corresponding to a portion or combination of radial zone within the field of view 110 of the camera lens 104. A variety of complex arrangements of the groups of the structures 202 can be used to address BFL variation of seemingly any amount. The groups of the structures 202 may be of varying size and associated different amounts of the field of view 110. A group of the structures 202 can correspond to a single radial zone or multiple radial zones; likewise, a group may be associated only with portions of one or more radial zones. For example, the structures 202 can include a first group that includes one third of all positions in the field of view 110. Each other group of the structures 202 may be much smaller in size. This way, when combined, the other groups include the rest of (e.g., two thirds) of the field of view 110. FIG. 4 provides additional details on the arrangements of the structures 202 and how their grouping within or on a surface of the phased metalens 108 relates to the specifications of the camera lens 104 for each of the radial zones.

The phased metalens 108 is fabricated such that each group of the structures 202 is configured to apply a unique focus correction (e.g., increase, decrease, zero) for achieving sufficient MTF and DoF at each different radial zone. Each group of the structures 202 is specifically configured for shifting light through their corresponding zone(s) or zone portion(s) of the camera lens 104. Each redirection (e.g., phase shifts) of the light 116-1 and 116-2 happens simultaneously; although a redirection caused by the structures 202 from one group can occur independent of any redirections caused by the structures 202 in the other groups.

For instance, the light 116-1 and the light 116-2 may reach the phased metalens 108 at slightly different times. A first group of the surface structures 202 may correspond to a first (e.g., a center) radial zone within the field of view 110, and a second group may correspond to a second radial zone (e.g., an outer region of the field of view 110 surrounding the first radial zone). The first group of the structures 202 can shift the light 116-1 obtained from the first radial zone while the second group of the structures 202 shifts the light 116-2 obtained from the second radial zone. These focus corrections enable the phased metalens 108 to shift wavefronts and cause them all to reach the focal plane 204 at nearly a same time (e.g., a near zero difference between t1 and t2).

The structures 202 in each group are configured to compensate for defocus caused by BFL variation (e.g., a difference in the BFL 112-1 and 112-2). For instance, at the center radial zone, rather than actually improve focus performance the first group may maintain focus ability from decreasing below a minimum level. The second group may increase focus ability at the outer radial zone (e.g., to be at or above the minimum level) which improves focus ability of the field of view 110, overall. The collective shifts caused by the multiple groups increase a depth of the focus window provided across the different zones (e.g., the entire field of view 110) of the camera lens 104, thereby improving overall MTF and/or DoF of the system 200.

Improved focus ability can improve image quality; the images 118 may have greater focus margins around the object of interest 114, resulting in improved performance for image-based applications and/or functions. For example, improved quality in the images 118 can enable a controller or other image-based system to obtain better situational awareness about the object of interest 114. Because of this improved image quality, the object of interest 114 can be detected with greater accuracy, which may improve vehicle operations (e.g., safe driving) near pedestrians, vehicles, and other objects in the field of view 110.

Example Results

FIG. 3-1 illustrates a line graph 300-1 showing a focus window 306-1 of an objective lens when there is a variation in back focal lengths across multiple zones without applying a phased metalens depth of focus increase across the multiple zones. In contrast, FIG. 3-2 illustrates a line graph 300-2 showing a focus window 306-2 of an objective lens when there is a variation in back focal lengths across multiple zones after applying a phased metalens depth of focus increase across the multiple zones. From applying the described techniques, the focus window 306-1 is enlarged to be the focus window 306-2, which has an increased attribute (e.g., depth, gain).

First, consider the line graph 300-1, which provides an example MTF profile for the camera lens 104 with multiple radial zones. The different radial zones each have a respective ideal BFL and focus performance relative the other zones. A first zone (e.g., center zone) may have an MTF function 302-1, a second zone (e.g., a middle zone) of the camera lens 104 may have an MTF function 302-2, and a third zone (e.g., an outer zone) may have an MTF function 302-3.

A typical fixed-focus camera focusing process without relying on a phased metalens includes causing the BFL 112 of the camera lens 104 relative the camera imager 106 to be at an intermediate BFL. For example, the first zone can be defocused and positioned to be slightly ahead (e.g., at a shorter BFL) than an ideal BFL for those radial positions. Or focus in the middle and outer zones can be improved through setting the BFL at radial positions in their zones to be behind or ahead (e.g., at a longer or shorter BFL) of their ideal BFL for those radial positions. This way, despite the different focus capability at different regions of the camera lens 104, the camera lens 104 may be focused on a region of interest in the field of view 110 having a focus window 306-1 with a depth 308-1 that achieves a desired DoF and/or MTF. However, there can be too much or too frequent variation in the BFL across the field of view 110, causing challenges in tuning the BFL to an intermediate value.

For a high performance ADAS lens, the sensitivity or amount of focus variation that occurs with even slight adjustments to the BFL (e.g., one or more microns) can be significantly higher that other lenses. The focus relationship over their field may not be monotonic and may instead have ideal BFL that widely changes as a function of field position. This variation can include large swings or deviations in the ideal BFL across the field. For example, focus performance of the lens may be higher at center and one or more intermediate and/or outer zones, and lower in remaining radial zones. An example variation in the BFL between the center of the image field and the outermost image field position may be approximately fifteen to twenty microns (e.g., seventeen). An example intermediate BFL may be at or near a mid-point of this variation (e.g., at around eight to ten microns), which causes focus ability to have a smaller variation between different radial zones. This approach minimizes the residual defocus over the whole image field at the expense of reducing the MTF and/or the DoF at field positions with higher potential focus ability.

Now consider the line graph 300-2, which provides an example MTF profile when the phased metalens 108 is used in combination with the camera lens 104 with the MTF profile shown in FIG. 3-1. The camera lens 104 has three different radial zones each having a respective ideal BFL and focus performance, which provides an inconsistent MTF performance across the field of view 110. However, when the phased metalens 108 is arranged between the camera lens 104 and the focal plane 204, the MTF performance across the radial zones is normalized; the phased metalens 108 causes the depth 308-1 of the focus window 306-1 to increase.

The phased metalens 108 causes light shifts that provide the focus window 306-2 with a depth 308-2 that is greater than the depth 308-1 when the phased metalens 108 is removed. For example, the first zone (e.g., center zone) may have an MTF function 302-4 that is similar to the MTF function 302-1, however, the second and third zones (e.g., a middle and outer zone) have an MTF function 302-5 and 302-6.

In contrast to the MTF functions 302-2 and 302-3, which are offset from a peak of the MTF function 302-1, the MTF functions 302-5 and 302-6 are peak aligned to the MTF function 302-4. The phased metalens 108 is configured to adjust the MTF functions 302-5 to peak at or near a field position of a peak of the MTF functions 302-4. In addition, the MTF functions 302-6 is adjusted to peak at or near the same field position where the MTF functions 302-4 reaches a maximum performance. While primarily described for improving the depth of focus windows, in some cases, providing the focus window 306-2 has other benefits. For example, a gain of the focus window 306-2 may be higher than the focus window 306-1, which can improve image quality.

FIG. 4 illustrates a conceptual diagram 400 of multiple zones of an objective camera lens which vary in ideal back focal length across the multiple zones. The unique radial zones each correspond to a different range of radial distances from a center of the phased metalens 108. For example, the camera lens 104 may have a first zone 402-1 including a range of positions 404-1 from center, which includes a center area of the field of view 110. A second zone 402-2 surrounds the zone 402-1 to include a range of positions 404-2 within a middle region of the field of view 110. An outer region is included in a third zone 402-3, which has a range of positions 404-3 that surrounds the second zone 402-2.

Image quality requirements (e.g., MTF) for the first zone 402-1 can be higher than for the second and third zones 402-2 and 402-3. However, because an ideal BFL of the second and third zones 402-2 and 402-3 do not coincide with the ideal BFL at the first zone 404-1, a composite or effective focus window is narrower than a focus window at any one region. To improve performance over the entire field of the camera lens 104, the phased metalens 108 can deposit the structures 202 into groups corresponding to each of the different radial zones of the camera lens 104.

A first group of the surface structures 202 is configured to compensate for the defocus caused by the different BFL by maintaining or increasing (e.g., not decreasing) a focus quality at the first zone 402-1. A second group of the surface structures 202 is configured to compensate for the defocus caused by the different BFL by maintaining or increasing a focus quality at the second zone 402-2. A third group of the surface structures 202 is configured to compensate for the defocus caused by the different BFL by maintaining or increasing a focus quality at the third zone 402-3. Each group of the surface structures 202 can maintain or increase focus ability for one of the three different zones.

The phased metalens 108 can be designed to include the structures 202 such that, at each region or zone of the camera lens 104, variation is corrected in the BFL as a function of position in the field of view. This can cause the camera lens 104 to achieve a better focus window that is wider or has greater depth. A phase relationship for designing the phased metalens 108 is defined by the Equation:

$$\varphi_{nf}(x, y) = \frac{2\pi}{\lambda_d}\left(f - \sqrt{x^2 + y^2 + f^2}\right).$$

The phase relationship of the structures 202 as defined above is based on a design wavelength $\lambda_d$ for, a sub-wavelength structure shape at x and y coordinates on the phased metalens 108, and a focal length f. The phased metalens 108 can be designed with multiple unique phase profiles designed for multiple redirections of the light exiting the phased metalens 108, that that it is provided on the focal plane 204 in phase.

Figure 5:
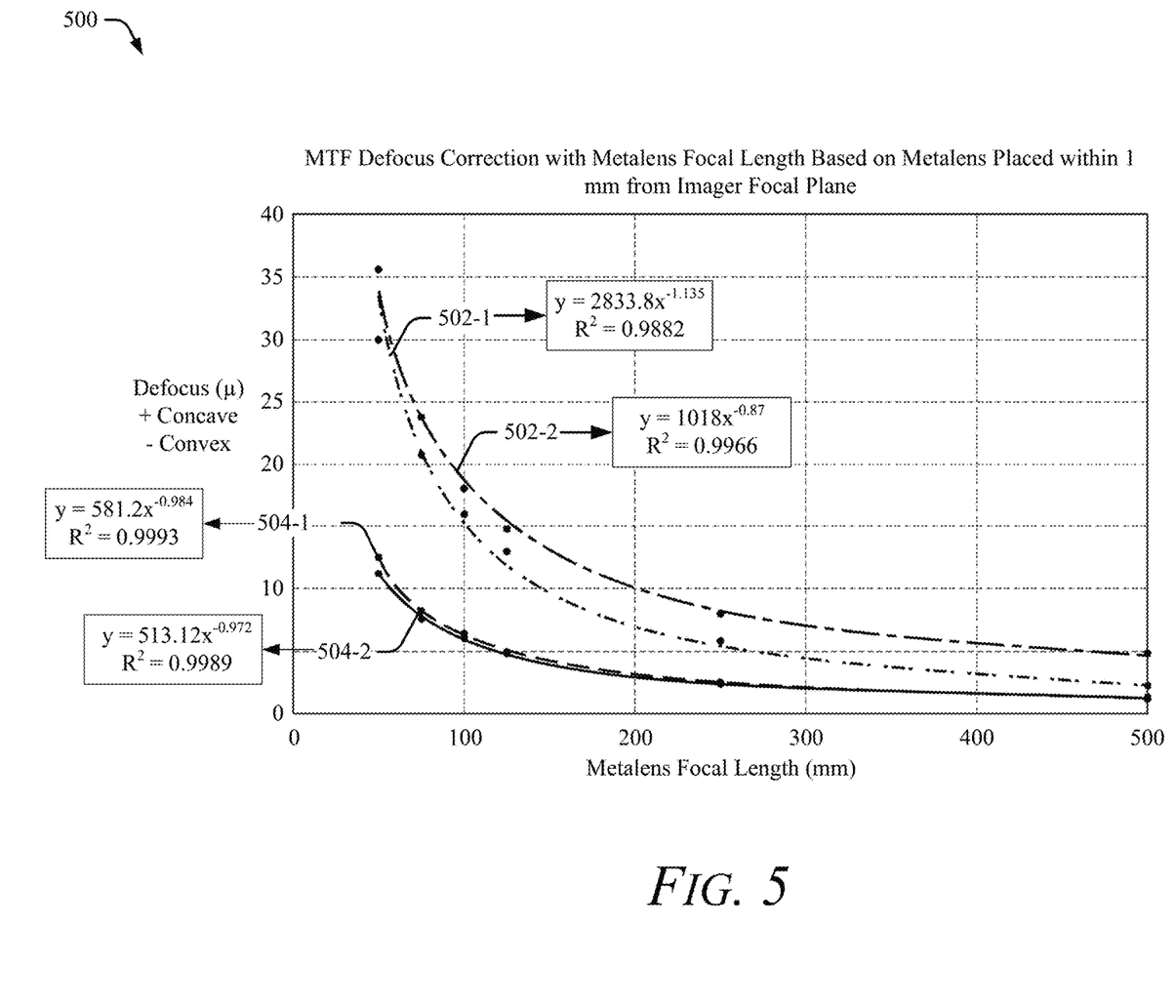
FIG. 5 illustrates a line graph showing example defocus corrections obtained across multiple zones of an objective camera lens using phased metalens depth of focus increase for camera focusing, in accordance with techniques of this disclosure.

FIG. 5 illustrates a line graph showing example defocus corrections 500 obtained across multiple zones of an objective camera lens using phased metalens depth of focus increase for camera focusing, in accordance with techniques of this disclosure. Prior to placing the phased metalens 108 between the camera lens 104 and the focal plane 204, a first zone (e.g., outer zone) may have a defocus characteristic 502-1 as a function of BFL. A second zone (e.g., middle zone, central zone, inner zone) may have a defocus characteristic 504-1 as a function of BFL. After placing the phased metalens 108 between the camera lens 104 and the focal plane 204, the defocus characteristics 504-1 and 502-1 are improved. The first zone may have a defocus characteristic 502-2 and the second zone may have a defocus characteristic 504-2. The two zones may have improved focus ability despite variation in the BFL 112.

Figure 6:
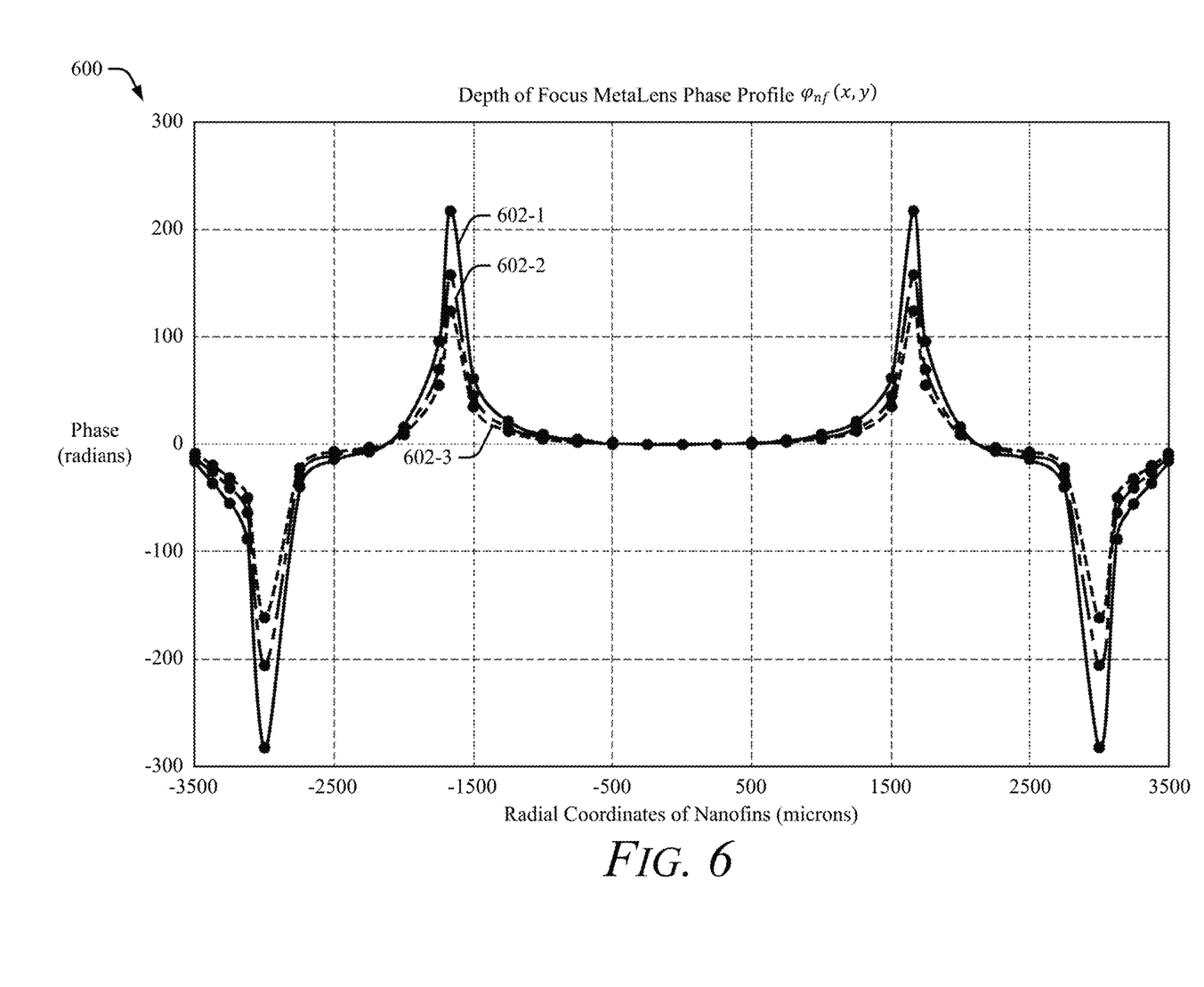
FIG. 6 illustrates a line graph showing an example phase profile for a phased metalens configured to increase depth of focus for camera focusing across multiple zones of an objective camera lens, in accordance with techniques of this disclosure.

FIG. 6 illustrates a line graph showing an example phase profile 600 for a phased metalens configured to increase depth of focus for camera focusing across multiple zones of an objective camera lens, in accordance with techniques of this disclosure. The profile 600 highlights a phased metalens phase profile that compensate for changes in defocus across a visible bandwidth including blue, green, and red wavelengths. The profile 600 can be specifically controlled to adjust varying amounts of BFL correction over the visible wavelengths. The phased metalens 108 can be designed to have the profile 600 fabricating the structures 202 to be grouped with different optical characteristics across the field of view 110. This can include increasing focus, decreasing focus, or not decreasing and maintaining focus. For example, at a center zone, rather possibly decrease focus ability (e.g., at center) as can happen when tuning the BFL 112 using existing intermediate BFL techniques, the high performance at the center can be maintained and only regions needing correction or improvement can be adjusted. By compensating the defocus effect across the image field without losing performance at high focus ability regions, a depth of the focus window can be increased by a factor of fifty to one hundred percent.

Figure 7:
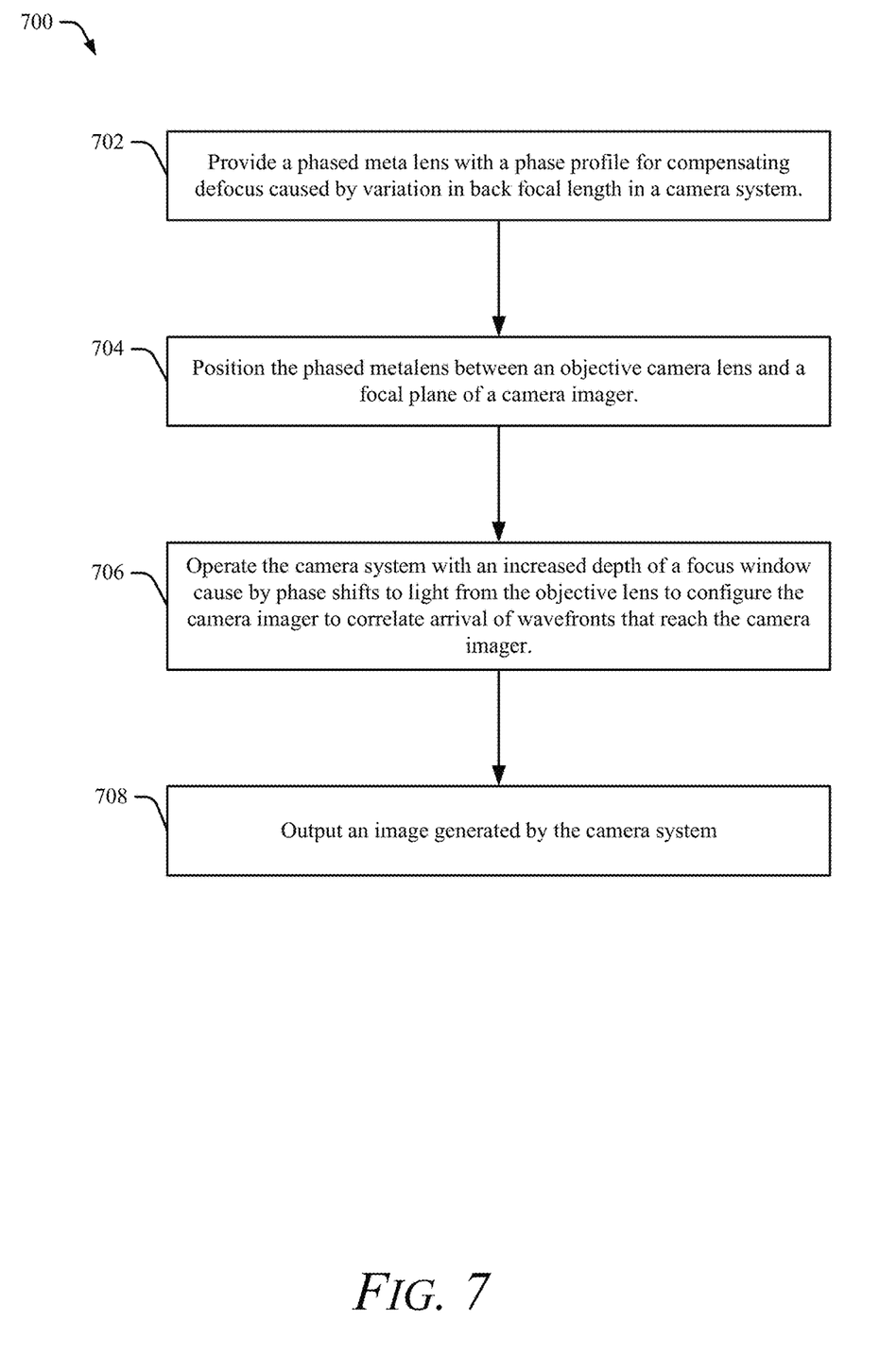
FIG. 7 illustrates a flow diagram of an example process including phased metalens depth of focus increase for camera focusing, in accordance with techniques of this disclosure.

FIG. 7 illustrates a flow diagram of an example process 700 including phased metalens depth of focus increase for camera focusing, in accordance with techniques of this disclosure. The operations (or steps) 702 through 708 are performed but not necessarily limited to the order or combinations in which the operations are shown herein. Further, any of one or more of the operations may be repeated, combined, or reorganized to provide other operations.

At 702, provided is a phased meta lens with a phase profile for compensating defocus caused by variation in back focal length in a camera system. For example, the phased metalens 108 includes the structures 202, which may be deposited on or within a substrate of optically transparent material, as described above. The structures 202 may be formed of metamaterials with structural features that can manipulate light waves and may be arranged and sized based on a wavelength of the electromagnetic radiation being sensed.

At 704, the phased metalens is positioned between an objective camera lens and a focal plane of a camera imager. For example, the phased metalens 108 may be positioned near (e.g., within one millimeter) of the focal plane 204. The position of the phased metalens 108 relative the BFL 112 is determined by the phase profile of the phased metalens 108 and/or characteristics of the camera lens 104 and/or the camera imager 106.

At 706, the camera system operates with an increased depth of a focus window cause by phase shifts to light from the objective lens to configure the camera imager to correlate arrival of wavefronts that reach the camera imager. The structures 202 are grouped into a plurality of arrangements having unique phase profiles that define a plurality of resolution units that delay light transmitted through the resolution units by differing amounts of time including zero delay. The delay of the structures 202 can be a different amount depending on location of the structures 202 within the field of view 110 (e.g., based on a radial distance from center).

At 708, an image generated by the camera system is output. For example, the images 118 may be generated by the camera system 102 to include a quality representation of the object of interest 114 relative the rest of the images 118. A processor, controller, or other logic can receive image data from the camera system 102 that includes the images 118. Based on the high quality images 118 including sufficient focus margin, the recipient of the image data can execute image based functions. This can include acquiring the images 118 with a vehicle processor and detecting the object of interest 114 based on detecting pixel variation, including sufficient clarity to distinguish objects from the rest of the images 118.

Further Examples

Some further examples in view of the techniques described above include:

Example 1: A system, comprising: an objective camera lens configured to provide a focus window across multiple radial zones within a field of view; a camera imager configured to capture an image of the field of view, wherein at least two of the radial zones have different back focal lengths relative the imager and the objective lens; a phased metalens configured to compensate for defocus caused by the different back focal lengths by increasing, across the radial zones within the field of view, a depth of the focus window.

Example 2: The system of example 1, wherein the objective lens provides an inconsistent modular transfer function performance across the radial zones; wherein the phased metalens is configured to improve the modular transfer function performance across the radial zones through increasing the depth of the focus window.

Example 3: The system of any preceding example, wherein the phased metalens is further configured to not decrease the modular transfer function performance across any of the radial zones.

Example 4: The system of any preceding example, wherein: the objective lens provides a first modular transfer function performance across a first radial zone; the objective lens provides a second modular transfer function performance across a second radial zone that is different than the first modular transfer function performance; and the phased metalens is configured to improve the modular transfer function performance across the first radial zone and the second radial zone through adjusting the first modular transfer function performance to align to a peak field position of the second modular transfer function.

Example 5: The system of any preceding example, wherein: the objective lens provides a third modular transfer function performance across a third radial zone; and the phased metalens is configured to improve the modular transfer function performance across the first radial zone, the second radial zone, and the third radial zone through adjusting the third modular transfer function performance to align to the peak field position of the second modular transfer function.

Example 6: The system of any preceding example, wherein: the phased metalens comprises a static element at a fixed position between the objective lens and a focal plane of the imager to cause light transmitted from the objective lens and to the focal plane to be adjusted by the phased metalens.

Example 7: The camera of any preceding example, wherein the fixed positioned is within 1 mm of the focal plane.

Example 8: The system of any preceding example, wherein the phased metalens comprises: a plurality of surface structures configured to achieve near diffraction limited focusing over all visible wavelengths.

Example 9: The system of any preceding example, wherein the phased metalens comprises: a plurality of sub-wavelength structures that range from two times to eight times smaller than a wavelength associated with light that reaches the imager.

Example 10: The system of any preceding example, wherein the phased metalens comprises: a plurality of surface structures arranged into multiple groups, each of the groups corresponding to a unique radial zone within the field of view.

Example 11: The system of any preceding example, wherein: a first group of surface structures corresponds to a center radial zone within the field of view; and the first group of surface structures configured to compensate for the defocus caused by the different back focal lengths as a focus quality at the center radial zone is maintained.

Example 12: The system of any preceding example, wherein: a second group of surface structures corresponds to a second radial zone within the field of view that surrounds the center radial zone; and the second group of surface structures is configured to compensate for the defocus caused by the different back focal lengths by adjusting a focus quality at the second radial zone as the focus quality at the center radial zone is maintained.

Example 13: The system of any preceding example, wherein: a third group of surface structures corresponds to a third radial zone within the field of view that surrounds the second radial zone; and the third group of surface structures is configured to compensate for the defocus caused by the different back focal lengths by adjusting a focus quality at the third radial zone as the focus quality at the second radial zone is adjusted.

Example 14: The system of any preceding example, wherein: one or more of the groups has a unique phase profile to cause a unique shift to light transmitted from the objective lens and to the imager through the phased metalens.

Example 15: The system of any preceding example, wherein: at least two of the groups has a same phase profile to cause a same shift to light transmitted from the objective lens and to the imager through the phased metalens.

Example 16: The system of any preceding example, wherein: the unique radial zone corresponding to each of the groups corresponds to a different range of radial distances from a center of the phased metalens.

Example 17: The system of any preceding example, wherein each of the groups of surface structures defines a plurality of resolution units with sizes based on a size of image pixels in the field of view.

Example 18: The system of any preceding example, wherein the phased metalens is further configured to cause light transmitted from the objective lens to arrive as wavefronts detected at a focal plane of the imager at approximately the same time.

Example 19: The system of any preceding example, further comprising: a camera housing configured to maintain the phased metalens at a fixed position between the objective lens and the imager.

Example 20: The system of any preceding example, further comprising: a vehicle configured to operate on a roadway, the vehicle comprising a processor configured control the vehicle based on the image.

Example 21: The system of any preceding example, further comprising a processor configured to generate image data for output to a vehicle system based on the image.

Example 22: A camera comprising means for generating image data for output to a vehicle system based on the image captured by the system of any preceding example.

Example 23: A computer readable media including instructions that, when executed, cause an image processor to generate image data for output to a vehicle system based on the image captured by the system of any preceding example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to camera systems, similar problems associated with lens alignment in other types of optical systems and sensors can occur. Therefore, although described to improve camera assembly performance, the techniques of the foregoing description can be adapted and applied to other problems to effectively assemble at low cost sensor devices with consistently high precision.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

What is claimed is:

1. A system, comprising: an objective camera lens configured to provide a focus window across multiple radial zones within a field of view; a camera imager configured to capture an image of the field of view, wherein at least two of the radial zones have different back focal lengths relative to the camera imager and the objective camera lens; a phased metalens configured to compensate for defocus caused by the different back focal lengths by increasing, across the radial zones within the field of view, a depth of the focus window.

2. The system of claim 1, wherein the objective camera lens provides an inconsistent modular transfer function performance across the radial zones; wherein the phased metalens is configured to improve the modular transfer function performance across the radial zones through increasing the depth of the focus window.

3. The system of claim 2, wherein the phased metalens is further configured to not decrease the modular transfer function performance across any of the radial zones.

4. The system of claim 2, wherein: the objective camera lens provides a first modular transfer function performance across a first radial zone; the objective camera lens provides a second modular transfer function performance across a second radial zone that is different than the first modular transfer function performance; and the phased metalens is configured to improve the modular transfer function performance across the first radial zone and the second radial zone through adjusting the first modular transfer function performance to align to a peak field position of the second modular transfer function.

5. The system of claim 4, wherein: the objective camera lens provides a third modular transfer function performance across a third radial zone; and the phased metalens is configured to improve the modular transfer function performance across the first radial zone, the second radial zone, and the third radial zone through adjusting the third modular transfer function performance to align to the peak field position of the second modular transfer function.

6. The system of claim 1, wherein the phased metalens comprises:

a plurality of surface structures arranged into multiple groups, each of the groups corresponding to a unique radial zone within the field of view.

7. The system of claim 6, wherein the surface structures are configured to achieve near diffraction limited focusing over all visible wavelengths.

8. The system of claim 6, wherein the surface structures comprise sub-wavelength structures that range from two times to eight times smaller than a wavelength associated with light that reaches the camera imager.

9. The system of claim 6, wherein: a first group of surface structures corresponds to a center radial zone within the field of view; and the first group of surface structures is configured to compensate for the defocus caused by the different back focal lengths as a focus quality at the center radial zone is maintained.

10. The system of claim 9, wherein:
a second group of surface structures corresponds to a second radial zone within the field of view that surrounds the center radial zone; and
the second group of surface structures is configured to compensate for the defocus caused by the different back focal lengths by adjusting a focus quality at the second radial zone as the focus quality at the center radial zone is maintained.

11. The system of claim 10, wherein:
a third group of surface structures corresponds to a third radial zone within the field of view that surrounds the second radial zone; and
the third group of surface structures is configured to compensate for the defocus caused by the different back focal lengths by adjusting a focus quality at the third radial zone as the focus quality at the second radial zone is adjusted.

12. The system of claim 6, wherein: one or more of the groups has a unique phase profile to cause a unique shift to light transmitted from the objective camera lens and to the camera imager through the phased metalens.

13. The system of claim 6, wherein: at least two of the groups has a same phase profile to cause a same shift to light transmitted from the objective camera lens and to the camera imager through the phased metalens.

14. The system of claim 6, wherein:
the unique radial zone corresponding to each of the groups corresponds to a different range of radial distances from a center of the phased metalens.

15. The system of claim 6, wherein each of the groups of surface structures defines a plurality of resolution units with sizes based on a size of image pixels in the field of view.

16. The system of claim 1, wherein the phased metalens is further configured to cause light transmitted from the objective camera lens to arrive as wavefronts detected at a focal plane of the camera imager at approximately the same time.

17. The system of claim 1, wherein: the phased metalens comprises a static element at a fixed position between the objective camera lens and a focal plane of the camera imager to cause light transmitted from the objective lens and to the focal plane to be adjusted by the phased metalens.

18. The camera of claim 17, wherein the fixed position is within 1 mm of the focal plane.

19. The system of claim 17, further comprising:
a camera housing configured to maintain the phased metalens at the fixed position.

20. The system of claim 1, further comprising:
a vehicle configured to operate on a roadway, the vehicle comprising a processor configured control the vehicle based on the image.

* * * * *

UNITED STATES PATENT AND TRADEMARK OFFICE
CERTIFICATE OF CORRECTION

| | |
|---|---|
| PATENT NO. | : 12,449,719 B2 |
| APPLICATION NO. | : 17/930030 |
| DATED | : October 21, 2025 |
| INVENTOR(S) | : Ronald M. Taylor et al. |

Page 1 of 1

It is certified that error appears in the above-identified patent and that said Letters Patent is hereby corrected as shown below:

In the Claims

Column 16, Claim 18; Line 25: delete "camera" and insert --system-- therefor

Signed and Sealed this
Sixth Day of January, 2026

John A. Squires
*Director of the United States Patent and Trademark Office*